A. MARON.
GOPHER TRAP.
APPLICATION FILED SEPT. 13, 1918.
1,344,807.
Patented June 29, 1920.
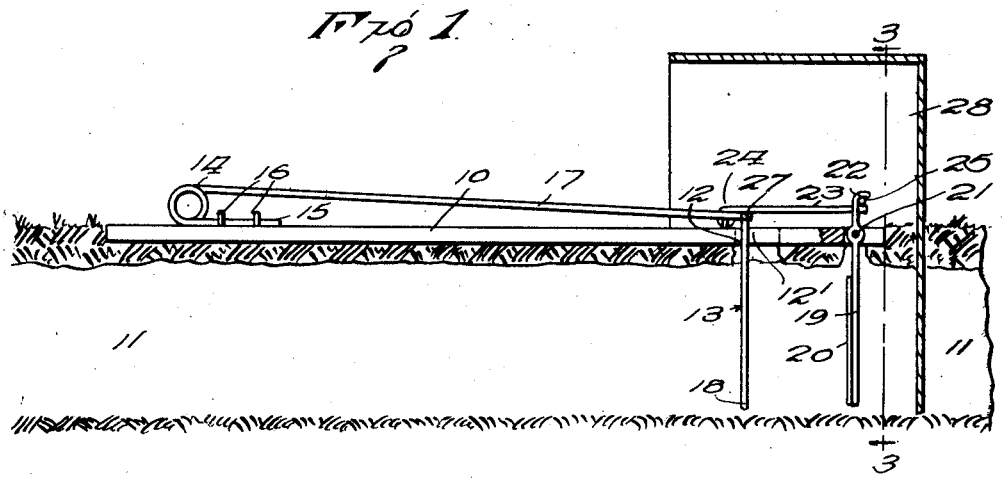
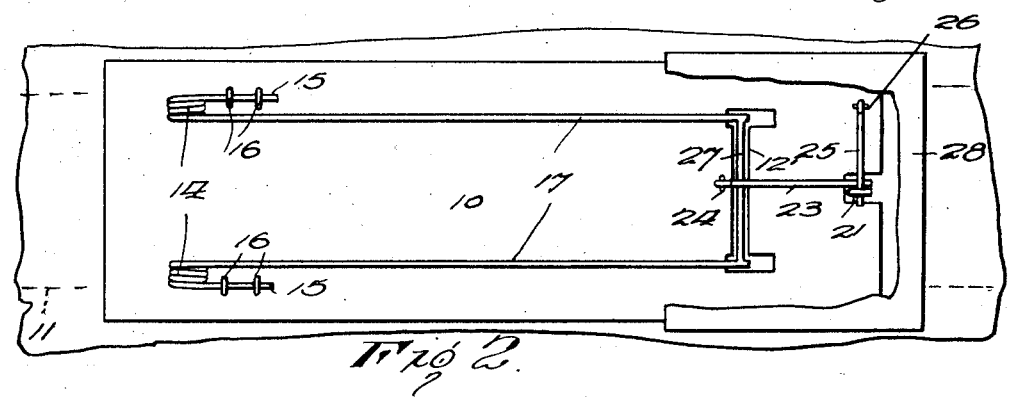
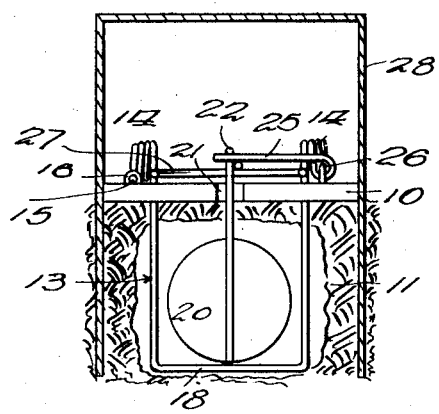
August Maron
Inventor
By Geo. P. Kimmel
Attorney

UNITED STATES PATENT OFFICE.

AUGUST MARON, OF WHITTIER, CALIFORNIA.

GOPHER-TRAP.

1,344,807.  Specification of Letters Patent.  Patented June 29, 1920.

Application filed September 13, 1918. Serial No. 253,927.

*To all whom it may concern:*

Be it known that I, AUGUST MARON, a citizen of the United States, and resident of Whittier, in the county of Los Angeles and State of California, have invented certain new and useful Improvements in Gopher-Traps, of which the following is a specification.

This invention relates to novel and useful improvements in gopher traps in the general class of animal traps, and the object thereof is to provide an improved gopher trap which will be much lighter and easier to set, and more readily actuated to release for catching the gopher or other burrowing animal of the rodent class.

A further object of the invention is to provide a gopher trap which will catch the gopher in his run, instead of in the trap as usually constructed, the device being quick in operation, simple in construction, and efficient in use, and durable.

With the above and other objects in view, as will appear as the description proceeds, the invention comprises the various novel features of construction and arrangement of parts which will be more fully described herein and set forth with particularity in the claim appended hereto.

Reference is had to the accompanying drawings forming a part of this application, in which like reference characters indicate the corresponding parts throughout the several views, in which—

Figure 1 is a side elevation showing my improved trap applied as in use, and partly in section Fig. 2 is a plan view thereof, and Fig. 3 is a transverse section showing the device actuated to catch the rodent, taken on line 3—3 of Fig. 1.

Referring to the drawings in detail, my improved trap comprises a rectangular base or plate 10 of galvanized iron plate, wood, or the like, though preferably the former, and adapted to be placed over the gopher's run indicated at 11, in which a slot is cut as shown at 12. Secured upon the top of the plate 10 is a wire or snare 13, preferably of U-shape and constructed of spring wire, the leg portions thereof being provided with coils 14, and the extremities 15 being anchored by staples or the like, as shown at 16, to the top of the frame 10. The arms 17 are thus adapted to be bent forwardly and downwardly, the same arms being of angular formation and depending at their free ends so that the bight portion 18 will extend into the slot 12' in the top of the frame.

In order to hold the snare in this position, a trigger 19 is provided, the same having a coiled end or enlargement 20 for producing an obstruction in the run, said trigger being pivoted near its upper end to the base, as shown at 21, and the upper free end or nose thereof being directed horizontally as shown at 22. Pivoted to the top of the frame between the leg portions 17 of the snare is a catch 23, the same being comparatively long and pivoted as shown at 24. The free end of the catch 23 is disposed on one side of the trigger 19 which is vertically arranged and a transversely acting catch 25, pivoted as shown at 26, is engaged over the end of the catch 23 and beneath the trigger portion 22, the catch 23 first being brought down over the intermediate transverse portion 27 of the snare in order to hold the latter down against the action of the coiled springs 14. The long catches pushed down near the board between the sides of legs 17 and engaged beside the trigger, and the short catch 25 brought into position over the long catch and in the notch of the trigger whereby the trap is set.

Thus, it will be seen that when the animal moves through his run, he will contact with the trigger after passing through the snare and will thus release the latter and be caught. In order to protect the operative parts which may be exposed, and particularly the trigger and operative parts associated therewith, a box or cover 28 is provided, said box being applied to the front of the trap when the latter is set, in view of the fact that the gopher's run has to be open to insert the trigger at the outer edge of the run, as is clearly shown in the drawings.

From the foregoing description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

An animal trap comprising a supporting body, a snare element including spaced side members spring controlled and connected by a loop at one end directed at right angles to the side members, a trigger device operating transversely of the loop and longitudinally of the side members, another trigger device operating transversely of the first mentioned trigger device, and a trip device engaged by the last mentioned trigger device and including an obstruction in proximity to the loop and in the path of the animal passing therethrough, said obstruction movable away from the loop to release the triggers.

In testimony whereof I affix my signature hereto.

AUGUST MARON.